United States Patent
Kolbenschlag

(10) Patent No.: US 10,746,318 B2
(45) Date of Patent: Aug. 18, 2020

(54) ELECTROMAGNETIC IMPACT VALVE ARRANGEMENT

(71) Applicant: Samson Aktiengesellschaft, Frankfurt am Main (DE)

(72) Inventor: Stefan Kolbenschlag, Darmstadt (DE)

(73) Assignee: SAMSON AKTIENGESELLSCHAFT, Frankfurt (DE)

(*) Notice: Subject to any disclaimer, the term of this patent is extended or adjusted under 35 U.S.C. 154(b) by 29 days.

(21) Appl. No.: 15/933,851

(22) Filed: Mar. 23, 2018

(65) Prior Publication Data

US 2018/0274692 A1    Sep. 27, 2018

(30) Foreign Application Priority Data

Mar. 23, 2017 (DE) .................. 10 2017 106 297

(51) Int. Cl.
*F16K 31/06* (2006.01)
*F15B 13/04* (2006.01)
*F15B 13/044* (2006.01)

(52) U.S. Cl.
CPC ...... *F16K 31/0675* (2013.01); *F15B 13/0401* (2013.01); *F15B 13/044* (2013.01); *F16K 31/0624* (2013.01); *F16K 31/0682* (2013.01)

(58) Field of Classification Search
CPC .......... F16K 31/0675; F16K 31/0624; F16K 31/0682; F15B 13/044; F15B 13/0401
(Continued)

(56) References Cited

U.S. PATENT DOCUMENTS 2,935,086 A * 5/1960 Lehman et al. ........ F16K 31/10
                                                            137/599.11
3,677,826 A    7/1972 Pointout et al.
(Continued)

FOREIGN PATENT DOCUMENTS

DE    19505233 A1    8/1996
DE    19636207 C2    8/2000
(Continued)

OTHER PUBLICATIONS

European Search Report dated Aug. 18, 2018, for Application No. 18163567.3.

*Primary Examiner* — Kevin L Lee
(74) *Attorney, Agent, or Firm* — Schiff Hardin LLP

(57) ABSTRACT

An electromagnetic impact valve arrangement for a pneumatically operated field device of a processing plant, such as a chemical plant, a food-processing plant, a power plant can include an air chamber into which three air conduits lead. The three air conduits can include an air supply conduit to receive compressed air from a compressed air supply source, a control air conduit to aerate and vent a pneumatic actuator of the field device, and a venting conduit to output compressed air to a pressure sink, such as the atmosphere. The impact valve arrangement can also include a first electromagnetic impact valve ("aeration impact valve") to open and/or close the air supply conduit and a second electromagnetic impact valve ("ventilation impact valve") to open and/or close the venting conduit. The first impact valve and the second impact valve can be electromagnetically coupled to one another.

20 Claims, 4 Drawing Sheets

(58) Field of Classification Search
USPC .................................... 137/637; 251/129.15
See application file for complete search history.

(56) References Cited

U.S. PATENT DOCUMENTS

| | | | | |
|---|---|---|---|---|
| 3,683,962 | A * | 8/1972 | Good | .................... F16K 11/168 |
| | | | | 137/868 |
| 6,003,552 | A * | 12/1999 | Shank et al. | .............. F16K 7/16 |
| | | | | 137/625.44 |
| 8,104,510 | B2 * | 1/2012 | Ams et al. | ............ F16K 11/052 |
| | | | | 137/625.44 |
| 2016/0123476 | A1 | 5/2016 | Yoshimura | |
| 2017/0292627 | A1 | 10/2017 | Kolbenschlag et al. | |

FOREIGN PATENT DOCUMENTS

| | | |
|---|---|---|
| DE | 102009033585 A1 | 1/2011 |
| DE | 102011011578 A1 | 8/2012 |
| DE | 102013220561 A1 | 4/2015 |
| DE | 102016106410 A1 | 10/2017 |

\* cited by examiner

ELECTROMAGNETIC IMPACT VALVE ARRANGEMENT

CROSS REFERENCE TO RELATED APPLICATIONS

This patent application claims priority to German Patent Application No. 10 2017 106 297.1, filed Mar. 23, 2017, which is incorporated herein by reference in its entirety.

BACKGROUND

The disclosure relates to an electromagnetic impact valve arrangement for a pneumatically operated field device, in particular a positioning device of a processing plant, such as a chemical plant, for example a petrochemical plant, a food-processing plant, such as a brewery, a power plant, such as a nuclear power plant, or the like.

A generic electromagnetic impact valve arrangement comprising an impact plate as impact valve member is known from DE 196 36 207 C2, which has proved its worth in the past. The electromagnetic impact valve arrangement has a housing structure, in which typically an air supply conduit is formed for connecting an air pressure source, an air discharge conduit and a venting conduit. An impact member in the form of a baffle plate is movably supported inside the impact valve arrangement. An electromagnetic controller displaces the impact valve member between two operating positions, in which one of the air ducts is closed in each case. The impact valve member is displaced in an axial positioning direction. The magnetic valve furthermore has a biasing member, such as a spring, which urges the impact valve member in axial positioning direction into a closed position for closing one of the air conduit. The simple technical setup and the accurate position using the electro-pneumatic controller has thereby proved its worth. The known magnetic valve requires an accurate fabrication, in particular when an accurate closing of the respective air duct in the case of a low energy requirement is to be ensured.

Another generic electromagnetic impact valve arrangement is described in the German patent application with the official file number DE 10 2016 106 410.6. This electromagnetic impact valve arrangement comprises an impact valve comprising a movably supported impact valve ball. An electromagnetic controller displaces the impact valve member in an axial control direction between operating positions, in which either the air supply conduit or the venting conduit is closed. The impact ball cooperates with a disc-like, magnetizable impact baffle, which moves together with the impact ball. A biasing member, such as a spring, pushes the baffle plate with the impact valve ball against the opening edge of the supply conduit, to close the latter in an air-tight manner. In the case of the impact valve arrangement described in DE 10 2016 106 410.6, the adjusting axis runs coaxially to the axis of the electromagnet, the core of which is realized as hollow cylinder, in order to realize the ventilation duct. With persistently high reliability, the electromagnetic impact valve arrangement according to DE 10 2016 106 410.6 allows for the operation of a position controller with a significantly reduced energy requirement as compared to the impact value arrangement known from DE 196 362 07 C2.

If a certain control pressure for generating a certain positioning force is to be generated in one of the conventional impact valve arrangements, or if a certain volume flow is to be generated for adjusting the positioning speed of an actuator, the electromagnetic impact valve arrangement needs to continuously change back and forth between pressure increase and pressure reduction. The impact plate needs to assume a certain intermediate position. Alternatively for achieving a certain volume flow in the case of a conventional valve, in which intermediate state the venting conduit as well as the aeration conduit are open at the same time to keep a desired adjusting pressure or volume flow approximately constant. In the case of such an intermediate position or a continuous change, pneumatic compressed air is lost continuously.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
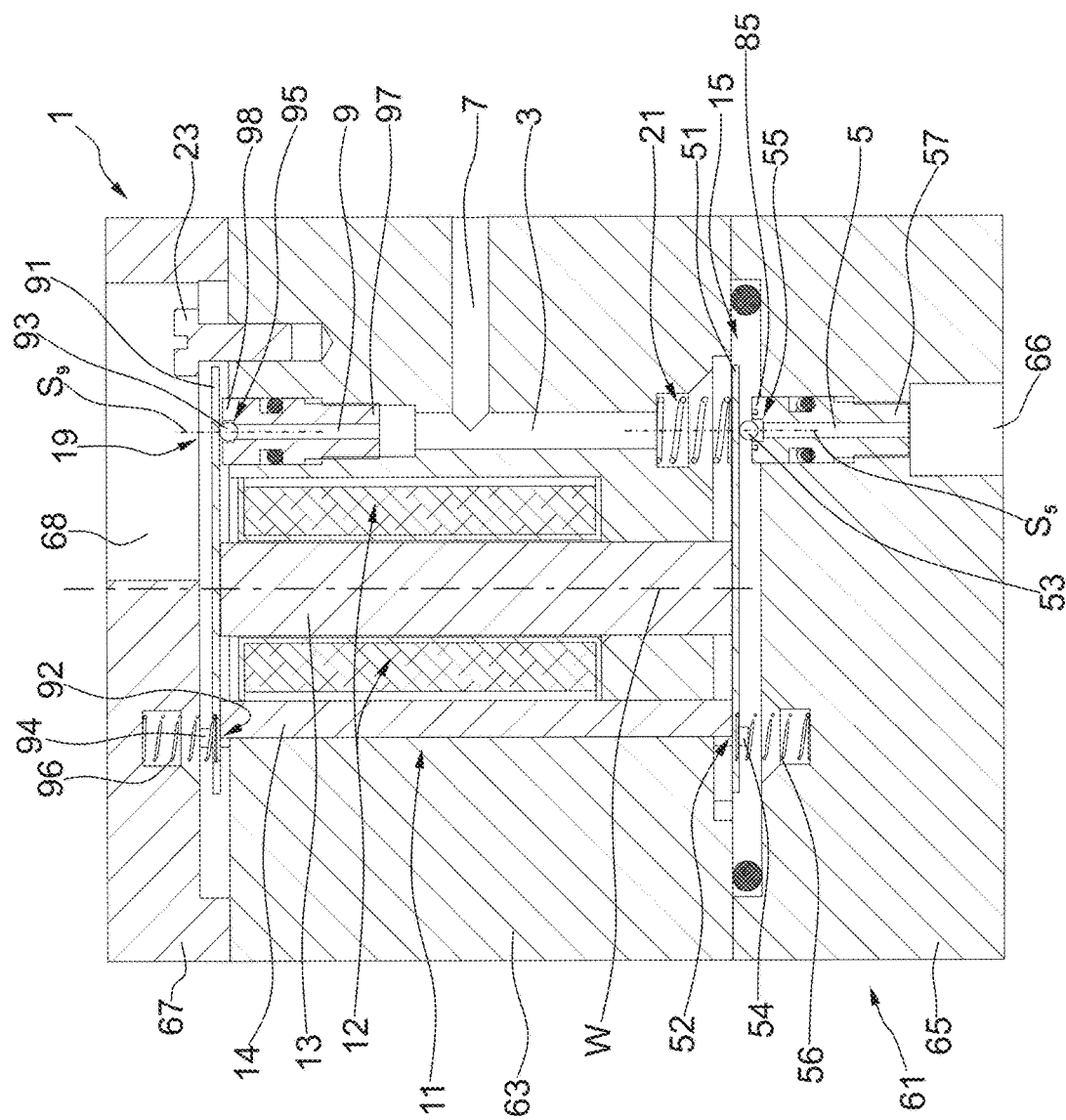
FIG. 1 illustrates an electromagnetic impact valve arrangement according to an exemplary embodiment of the disclosure in a cross-sectional view, which shows the impact valve arrangement in the state of pressure increase.

The exemplary embodiments of the present disclosure will be described with reference to the accompanying drawings.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

It is an object of the disclosure to overcome the disadvantages of the prior art, in particular to provide an electromagnetic impact valve arrangement for a pneumatically operated field device in particular of the generic type, so that an accurate mode of operation of the electromagnetic magnetic vale is ensured even in the case of different operating situations with the smallest possible, in particular electric and/or pneumatic energy requirement.

Accordingly, an electromagnetic impact valve arrangement for a pneumatically operated field device, in particular a positioning device of a processing plant, such as a chemical plant, a petrochemical plant, a food-processing plant, such as a brewery, a power plant, such as a nuclear power plant, or the like is provided. The electromagnetic impact valve arrangement has an air chamber comprising three air conduits or ducts. The three air conduit comprise an air supply conduit for receiving fresh air from a compressed air supply source, a control air conduit for aerating and venting a pneumatic actuator of the field device, and a venting conduit for outputting compressed air to a pressure sink, such as the atmosphere. In an exemplary embodiment, not more than three air conduits lead into the air chamber. In particular, the impact valve arrangement is embodied in such a way that, with the exception of its air ducts, the air chamber is closed in an air-tight manner, in particular with respect to the compressed air supply source and/or the pressure sink, for pressure differences between the pressure of up to, for example, 6 bar, up to 10 bar, or even up to 15 bar of the compressed air supply source and that of the pressure sink, in particular the atmosphere.

According to the disclosure, the impact valve arrangement includes a first electromagnetic impact valve for opening and/or for closing the air supply conduit, which can also be identified as aeration impact valve. The impact valve arrangement according to the disclosure further includes a second electromagnetic impact valve for opening and/or closing the venting duct, which can be identified as venting impact valve. Particularly, the aeration valve is arranged in the area of the air supply conduit, in particular at the opening of the air supply conduit to the air chamber. The venting impact valve is in particular arranged in the area of the venting conduit, at the opening thereof to the air duct, or at the pressure sink-side opening thereof, in particular its atmospheric opening. It shall be clear that the aeration impact valve and the venting impact valve do not use the same impact valve member. In the particular, the first electromagnetic impact valve has a first impact valve member arranged in the area of the air supply conduit and configured to selectively close the air supply conduit. The second electromagnetic impact valve has a second impact valve member arranged in the area of the venting conduit and configured to selectively close the ventilation duct. By using two different impact valve members, the electromagnetic impact valve arrangement according to the disclosure is structurally more complicated as compared to the two above-mentioned generic electromagnetic impact valve arrangements. In contrast to the known generic electromagnetic impact valve arrangements, the use of two impact valves, one on the air supply input and one on the venting output of the air chamber, allows for a differentiated adjustability of the impact valve arrangement. The first electromagnetic impact valve can be controlled to open or to close the air supply conduit. The second electromagnetic impact valve can be controlled to open or to close the venting conduit. Particularly, the first impact valve member and the second impact valve member can move mechanically independently from one another. In particular, a control movement of the first impact valve member cannot result in a forced mechanical operation of the second impact valve member and/or a control movement of the second impact valve member does not necessarily result in a forced mechanical operation of the first impact valve member. The first electromagnetic impact valve and the second electromagnetic impact valve can for example be opened simultaneously or closed simultaneously.

According to one embodiment, the first impact valve and the second impact valve are electromagnetically coupled to one another. The electromagnetic coupling of the first and of the second impact valve allows for a simple and energy-saving operation of the impact valve arrangement. The electromagnetic coupling of the aeration impact valve and of the ventilation impact valve results in a simple setup of the impact valve arrangement according to the disclosure. In that the same electromagnetic field is provided to operate the two impact valves of the impact valve arrangement, it can be prevented that an electromagnetic field of the first impact valve and an electromagnetic field of the second impact valve could interfere with one another.

In an exemplary embodiment of the disclosure, the first impact valve and the second impact valve are electromagnetically coupled to one another in such a way that at least one magnetic coil is in electromagnetic operative connection with the first impact valve and the second impact valve. The impact valve arrangement can also have two, three or more magnetic coils, which are operatively connected to the first impact valve as well as to the second impact valve. The impact valve arrangement can in particular include a set of magnetic coils, which is in electromagnetic operative connection with the first as well as with the second impact valve. In that at least one magnetic coil is in electromagnetic operative connection with the first as well as with the second impact valve, an operation of the aeration impact valve as well as of the ventilation impact valve can be caused by electrically operating or energizing, respectively, the same magnetic coil (s). The electromagnetic impact valve arrangement according an exemplary embodiment of the disclosure thus provides the advantage that the installation effort and the control efforts are kept low. In that an electric energy is applied to the joint magnetic coil of the first impact valve and of the second impact valve to generate a magnetic field, both impact valves of the electromagnetic impact valve arrangement can be controlled simultaneously, so that a highly accurate control can take place with little control effort. Alternative or, additionally, the first impact valve and the second impact valve can be electromagnetically coupled to one another in such a way that the same iron core is in electromagnetic operative connection with the first impact valve and the second impact valve. According to a further alternative or additional, supplemental embodiment, the first impact valve and the second impact valve can be electromagnetically coupled to one another in such a way that the same armature or the same yoke, respectively, is in electromagnetic operative connection with the first impact valve and the second impact valve. In that the two impact valves are in electromagnetic operative connection with the same iron core and/or the same armature, a generated magnetic field can be generated effectively and in a targeted manner for the aeration impact valve as well as for the venting impact valve using the same or different magnetic coils. In an exemplary embodiment, a single electromagnet comprising a magnetic coil-wound iron core can be provided, on the magnetic north or south pole of which the first impact valve is arranged and on the other magnetic pole of which the second impact valve is arranged. The first impact valve and/or the second impact valve can at least partially have a magnetic or magnetizable, for example soft-metallic impact valve member or can be in mechanical operative connection with a magnetic or at least partially magnetizable movable part. The magnetic or magnetizable part, which is part of the impact valve member or is at least connected thereto, can be arranged in such a way that the iron core and the armature or the yoke of the electromagnet can be magnetically connected by moveable part.

In an exemplary embodiment of the disclosure, the first impact valve and the second impact valve are attuned, synchronized and/or coordinated in such a way that the air supply conduit and the ventilation conduit can be closed at the same time. Significant savings of compressed air energy can be achieved in this way. While in the case of the conventional, above-described electromagnetic impact valve arrangements, either the aeration valve or the ventilation valve is always open, a pneumatic connection is always established between the pneumatic actuator of the field device, which is in fluidic communication connection with the control conduit and the compressed air source or the pressure sink in the case of a conventional impact valve arrangement. The pneumatic actuator thus typically experiences either a pressure increase, when the aeration conduit is open, or a pressure reduction, when the venting conduit is open.

In that the two impact valves, the aeration valve and the venting valve of the electromagnetic impact valve arrangement can simultaneously assume a state which closes the respective air conduit, it can be effected that a constant adjusting pressure is maintained in the air chamber of the electromagnetic impact valve arrangement, in which no air escapes from the venting conduit. The electromagnetic impact valve arrangement according to an exemplary embodiment of the disclosure, an additional state of the pressure constancy can thus be effected in addition to the states of pressure increase and pressure reduction. When the electromagnetic impact valve arrangement assumes this pressure constancy state, a predetermined desired adjusting pressure of the pneumatic actuator, which is in pneumatic communication connection with the air chamber using the control conduit, can keep this adjusting pressure constant, with a compressed air consumption, which is significantly reduced or even completely avoided as compared to conventional electromagnetic impact valve arrangements.

In that only the aeration valve is open, a constant volume flow can be allowed to pass. A proportional behavior between the magnetic coil control current and the pressure of the control air conduit can be provided for aerating or venting the pneumatic actuator. In particular, one respective certain control air pressure or control air volume flow can correspond to one respective magnetic coil position control current.

While the ventilation valve or venting value is closed, the aeration valve can assume a closed position or can open starting from the closed position. In an exemplary embodiment, an opening cross section of the aeration valve is adjusted continuously. The aeration valve can assume different open positions to provide a throttle effect, so that a desired volume flow from the compressed air supply source to the control air conduit can be adjusted to be constant. A proportional behavior between a control operating parameter, for example a magnetic coil control current of an electromagnetic actuator, and the volume flow through the control air duct to operate the pneumatic actuator can be attained in this way.

In an exemplary embodiment of the disclosure, the electromagnetic impact valve arrangement is embodied in such a way that the second impact valve closes before the first impact valve opens and that that the first impact valve closes before the second impact valve opens. Such an adjustment of the first impact valve and of the second impact valve in terms of construction or control causes that, in response to a switchover between (a) a pressure increase state, in which the venting valve is closed and the aeration valve is open, so that a pneumatic communication connection from the compressed air supply source to the pneumatic actuator is provided, into (b) the pressure reduction state, in which the aeration valve is closed and in which the venting valve is open, so that a pneumatic communication connection from the pneumatic actuator to the pressure sink is provided, always occurs in such a way that a transition occurs via the pressure constancy state (c) of the electromagnetic impact valve arrangement. Before the impact valve arrangement changes from pressure increase to pressure reduction, the impact valve arrangement must initially change from pressure increase to pressure constancy, so as to be able to subsequently change from pressure constancy to pressure reduction. Vice versa, an intermediate step, in which the impact valve arrangement changes from pressure reduction to pressure constancy and can only subsequently change from pressure constancy to pressure increase, must initially occur in response to changing from pressure reduction to pressure increase. No undefined intermediate state occurs.

In an exemplary embodiment, the first impact valve is configured to change between the open and the closed state in the case of a first magnetic coil control current threshold value, and the second impact valve can be designed to change between the open and the closed state in the case of a second magnetic coil control current threshold value. The impact valve arrangement can then be designed in such a way that the venting impact valve is open, and the aeration impact valve is closed in the case of a magnetic coil control current and below the first and second threshold value. If the magnetic coil control current is increased to a value above the second threshold value, but still below the first threshold value, both impact valves of the impact valve arrangement can be closed. When the first as well as the second threshold value is exceeded by the magnetic coil control current threshold value, the aeration valve can be open, and the ventilation valve can be closed.

In an exemplary embodiment of the disclosure, the first impact valve, that is: the aeration impact valve, includes an impact valve member, such as an impact plate, a baffle ball or the like, an electromagnetic controller, which displaces the impact valve member to open and/or close the supply air conduit in an axial positioning direction, as well as in particular a preferably force-adjustable biasing member, such as a spring, in particular comprising an adjustable pretension, which forces the first impact valve member in the axial positioning direction into a closed position for closing the supply air duct. The magnetic operating force from the electromagnetic controller acts directly or indirectly on the impact valve member counter to the direction of action of the closing force of the biasing member. The electromagnetic operating force, which can be provided by the controller, or control force can be at least 0.01 N, 0.02 N, 0.05 N or 0.075 N and/or maximally 10 N, 5 N, 1 N, 0.5 N, 0.25 N or 0.1 N. In an exemplary embodiment, an operating force of 0.09 N is provided. In an exemplary embodiment, the biasing member acts contrary to a (pneumatic) pressure force, which acts on the first impact valve member, by using the compressed air from the compressed air supply source. In an exemplary embodiment, the closing force of the biasing member is adjusted in such a way that it is only slightly higher than the pressure force, which acts on the first impact valve member, at least, for example, 0.001 N, 0.002 N, 0.005 N, 0.0075 N, 0.0010 N and/or maximally 0.075 N, 0.05 N, 0.02 N or 0.015 N larger than the provided compressive supply force. In an exemplary embodiment, the closing force generated by the biasing member is selected in such a way that it ensures a reliable closed position of the first impact valve member in response to the predetermined supply pressure in consideration of the pneumatically active cross section of the first impact valve member and of the expected compressed air fluctuations. In an exemplary embodiment, the closing force of the biasing member is chosen to be so small, and can in particular be freely adjustable, such that an energy-saving electromagnetic controller can bring the first impact valve member into its open position with a low, energy consumption-optimized, electromagnetic adjusting effect. Compared to the opening force, which can be provided by the electromagnetic controller, the closing force of the biasing member must be sufficiently small, so that it is ensured with sufficient operational safety that the first impact valve member can safely be placed into the open state. In an exemplary embodiment, the opening force for the first impact valve member, which force can be provided by the electromagnetic controller, is slightly larger than the effective closing force in response to normal operation of the compressed air supply source. In an exemplary embodiment, the opening force for the first impact valve member, which force can be provided by the electromagnetic controller, is at least 1.05×, at least 1.1× or at least 1.15× as large as the coercive closing force or as the effective closing force, respectively, in response to normal operation of the compressed air supply source. In an exemplary embodiment, the opening force is, for example, maximally 2.0×, maximally 1.5× or maximally 1.2× as large as the effective closing force in response to normal operation of the compressed air supply source. In an exemplary embodiment, the second impact valve is free from any biasing member forcing it into its closed position. The second impact valve can have a biasing member urging it in the direction of its open position.

In an exemplary embodiment of the disclosure, a predetermined (e.g. constant) control pressure in the air chamber and/or the control air conduit can be adjusted by the first impact valve. The adjustment can be based on (e.g. as a function of) a control current of the electromagnetic controller. In an exemplary embodiment, the adjustment is proportional to the control current. In an exemplary embodiment, the supply pressure provided by the compressed air supply source is constant. In an exemplary embodiment, a predetermined control current in each case corresponds to a predetermined, in particular constant control air pressure. The first impact valve can in particular be dimensioned in such a way, the electromagnetic control force of the controller, which can be provided by a control current and which acts contrary to the biasing member, are in particular dimensioned in such a way with regard to the available provided supply pressure from the compressed air supply source that the force path of the coercive, which is a function of the adjustment travel with respect to the impact valve member, acts in such a way contrary to the forces, which act in the opening direction as a result of the pressure difference between supply pressure and control pressure plus the electromagnetic control force from the controller such that a change of the control current results in a proportional change of the control pressure. In an exemplary embodiment, the impact plate valve arrangement, a particularly simple regulation with regard to a predetermined (e.g. constant) control pressure can be attained in this way. It is particularly advantageous thereby that, for example in the case of a leakage in the pneumatic actuator of the positioning device, or if the positioning device requires a permanent control air volume flow, a variable opening width of the first impact valve can be ensured by a constant adjustment of a control current, so as to equalize the control air discharge at the pneumatic actuator.

In an exemplary embodiment of the disclosure, the first impact valve is closed in the absence of an electrical current and the second impact valve is open in the absence of an electrical current. A state without current prevails in this embodiment, in which the magnetic coil of the electromagnetic controller is not energized, a pressure reduction, or emergency ventilation state is thus present when the electromagnetic impact valve arrangement is switched to no current.

According to a specific embodiment, the first impact valve can have a biasing member, which urges it in the direction of the closed position, but which is not able to apply a closing force larger than the compressed air supply force acting on the first impact valve member. In fact, the urging force of such a biasing member is maximally as large as the compressed air supply force or slightly smaller. Upstream of the first impact valve, a bypass branch can lead from the control air conduit to the pneumatic actuator or to the control air conduit. For certain pneumatic positioning devices, a minimal residual air consumption may be desired, for example as purging air for position controllers forcing a corrosion risk, e.g. due to moisture or corrosive gases, which can penetrate into the devices and which are to be washed out by the pneumatic supply air.

In an exemplary embodiment of the disclosure, the first impact valve and the second impact valve are electromagnetically dimensioned identically in such a way that substantially identical magnetic forces act on the first impact valve and on the second impact valve when applying the same magnetic control current or magnetic coil control current, respectively. In an exemplary embodiment, the size of the electromagnetic actuating power acting on the first impact valve is identical to the electromagnetic actuating power acting on the second impact valve member. A simple controllability of the electromagnetic impact valve arrangement is ensured in this way by design.

In an exemplary embodiment, of the disclosure, the first impact valve and the second impact valve are pneumatically dimensioned identically in such a way that when the same pressure difference applies on the respective impact valve, a substantially identical pneumatic compressive forces act on the impact valve members of the impact valves. In an exemplary embodiment, the effective pneumatic effective area of the first impact valve member is equal to the effective pneumatic effective area of the second impact valve member. In an exemplary embodiment, the supply air duct in the area of the first impact valve member is equal to the venting conduit in the area of the second impact valve member. It is also conceivable that the effective pneumatic cross section of the aeration valve is dimensioned to be larger than or equal to the effective pneumatic cross section of the venting valve, so that, for example in response to a failure of a closing coercive of the aeration valve, a different compressive force is necessary for opening the aeration valve than for opening the venting valve.

In an exemplary embodiment of an impact valve arrangement according to the disclosure, the first impact valve comprises a closing body, which is located on the positioning direction axis and which, for closing the air supply duct, engages with a valve nozzle of the air supply duct, which is encompassed or surrounded by the impact valve seat of the first impact valve, in such a way that the first impact valve member is arranged at a circumferential axial distance to the first valve nozzle. Alternatively or additionally, the second impact valve can comprise a second closing body, which is located on the positioning direction axis and which, for closing the venting duct, engages with an impact valve nozzle of the venting duct, which is encompassed or surrounded by the second impact valve seat, in such a way that the second impact valve member is arranged at a circumferential axial distance to the second valve nozzle.

It is clear that the circumferential axial distance appears in particular when the impact valve member is oriented in an in particular vertical position to the positioning direction axis. The impact valve member is thereby positioned in such a way with respect to the opening edge of the air duct, which is to be closed, that an automatic orientation of the impact valve member is initiated in response to the displacement thereof into the closed position, in particular under the impact of the electromagnetic forces and/or of the biasing member. In an exemplary embodiment, the air conduit, which is to be closed, and the opening edge thereof are embodied as valve seat bore or as separate nozzle insert in the air chamber boundary wall. The impact valve member, the seat bore, and an in particular axial maximum stroke of the impact valve member in the air chamber are dimensioned/configured in such a way that the impact valve member, in particular in the area of the seat bores, is held in particular by the boundary edge of the housing structure/of a core structure of the electromagnetic controller or of the nozzle insert, and is centered in the middle of the seat bore or the nozzle insert, in particular automatically, in response to the operation/closing. In the in particular inactive operation, the bore edges of the seat bore (or the annular edge of the insert, respectively) form the holding structure, against which the impact valve abuts so as to be held in the radial direction. In response to the operation/closing of the in particular spherical impact valve member, the automatic centering occurs.

In an exemplary embodiment of the disclosure, the closing element is formed as a protrusion projective from the preferably flat impact valve member and which is in particular formed to be at least partially convexly spherically. In an exemplary embodiment, the closing element is embodied as ball, which is separately installed in the impact plate and/or is made of a non-magnetic material, such as ceramic or stainless steel. In an exemplary embodiment, the separately installed ball consists exclusively of the non-magnetic material. The magnetic flux is not directed in the direction of the closing element in this way, but is deflected therefrom, so that the magnetic flux is diverted due to the non-magnetic closing element material. A magnetic adhesion of the ball due to the residual magnetism between ball and seat is thus prevented.

In an exemplary embodiment, at least one air duct, such as the ventilation duct or the air chamber, is embodied in the core of the electromagnetic controller. It is advantageous in particular in the case of this embodiment of the air chamber or of the air duct in the core, in which the closing area is to cooperate so as to form a tight seal, to provide the non-magnetic material for the closing element.

In an exemplary embodiment, the axial, in particular maximum movement amplitude of the impact valve member in the axial positioning direction is at least $1/10$, at least $1/8$ or at least $1/4$ of the nozzle diameter and/or maximally $9/10$, maximally $2/3$, maximally $1/2$ of the nozzle diameter. In an exemplary embodiment, the stroke or the movement amplitude, respectively, is in particular between 0.1 mm and 1.5 mm, between 0.2 mm and 0.6 mm, or 0.4 mm. In an exemplary embodiment, the impact plate thickness (cross section) is at least so thick that it is not yet magnetically saturated in response to the maximum energization of the magnetic coil. In an exemplary embodiment, the impact plate in particular has a small thickness of less than 2 mm, less than 1 mm, or less than 0.5 mm, to keep the mass of the impact plate small.

According to an embodiment of an impact valve arrangement according to the disclosure, the second impact valve, thus the ventilation valve, comprises an impact valve member, such as an baffle plate, an impact ball or the like, and an electromagnetic controller, which displaces the second impact valve member to open and/or close the ventilation duct in an axial positioning direction, as well as in particular a mechanical abutment, such as a stop adjusting screw, which is arranged in the axial positioning direction opposite the impact valve seat and which limits a maximum axial travel of the second impact valve. The mechanical abutment of the second impact valve member can determine the maximum axial travel of the second impact valve in an adjustable or constant manner. A short maximum axial travel of the second impact valve member can be chosen so that the second impact valve member releases the opening cross section of the nozzle opening exactly completely at the end of the short maximum axial distance to the second valve nozzle in the open state of the ventilation valve. In terms of the electrical energy consumption, a short adjustment travel is advantageous to keep the magnetic gap between the electromagnetic controller and the impact valve member, which is to be operated magnetically, small. A short adjustment travel can also be desirable in terms of a secure closing.

In an exemplary embodiment, of the disclosure, the first impact valve has a first valve nozzle on the positioning direction axis surrounded by the first impact valve seat, wherein the positioning direction axis is oriented substantially parallel to the effective axis of the electromagnet or of the electromagnetic controller, respectively, and is arranged in the area of the iron core, in particular coaxially to the iron core. Alternatively or additionally, the second impact valve can comprise a second valve nozzle on the positioning direction axis surrounded by the second impact valve seat, wherein the positioning direction axis is oriented substantially parallel to the effective axis of the electromagnet and is arranged in the axial area of the iron core, in particular coaxially to the iron core.

In an exemplary embodiment of the disclosure, the first impact valve comprises a (first) valve nozzle on the positioning direction axis surrounded or encompassed by the first valve seat, wherein the positioning direction axis of the first impact valve is arranged offset to the effective axis of the electromagnetic controller, in particular of the electromagnet, in particular by at least the outer radius of the iron core or at least the radius of the magnetic coil. In the alternative or in addition, the second impact valve can comprise a (second) valve nozzle on the poisoning direction axis encompassed or surrounded by the second valve seat, wherein the positioning direction axis is arranged offset to the effective axis of the electromagnetic controller, in particular of the electromagnet, in particular by at least the outer radius of the iron core or the radius of the magnetic coil. In such an embodiment, the impact valve member can be articulated in the manner of a lever and can have a center of gravity, which can be arranged opposite the valve nozzle with respect to the effective axis of the electromagnetic controller. In an exemplary embodiment, the positioning direction axis of the first valve nozzle is coaxial to the positioning direction axis of the second valve nozzle.

It shall be clear that the disclosure also relates to a pneumatically operated field device, in particular a positioning device, comprising an impact valve arrangement according to the disclosure, wherein the field device further includes a pneumatic actuator, such as a pneumatic actuator, which communicates pneumatically with the control air conduit. In an exemplary embodiment, the pneumatic actuator comprises at least one pneumatic working chamber, which has only one single pneumatic control input for both pressure build-up and/or pressure reduction, wherein said single pneumatic control input is connected to the control air conduit of the electromagnetic impact valve arrangement. The field device can further include a pneumatic compressed air source, such as a compressed air tank, a compressor, a supply line or the like, which is pneumatically connected to the air supply conduit.

The electromagnetic impact valve arrangement illustrated in the figures is generally provided with reference numeral 1. The electromagnetic impact valve arrangement 1 comprises an air chamber 3, into which an air supply conduit 5, a control air conduit 7 and a venting or ventilation conduit 9 lead. The air chamber 3 and the air conduits or ducts 7, 9 are enclosed in a housing structure 61. The housing structure 61 effects a sealing of the air chamber 3 against the environment, so that the air chamber 3 is fluidically connected to pneumatic components, such as a pneumatic drive, a pneumatic compressed air source or the atmosphere exclusively via the air supply conduit 5, the control air conduit 7 or the venting conduit 9.

Figure 2:
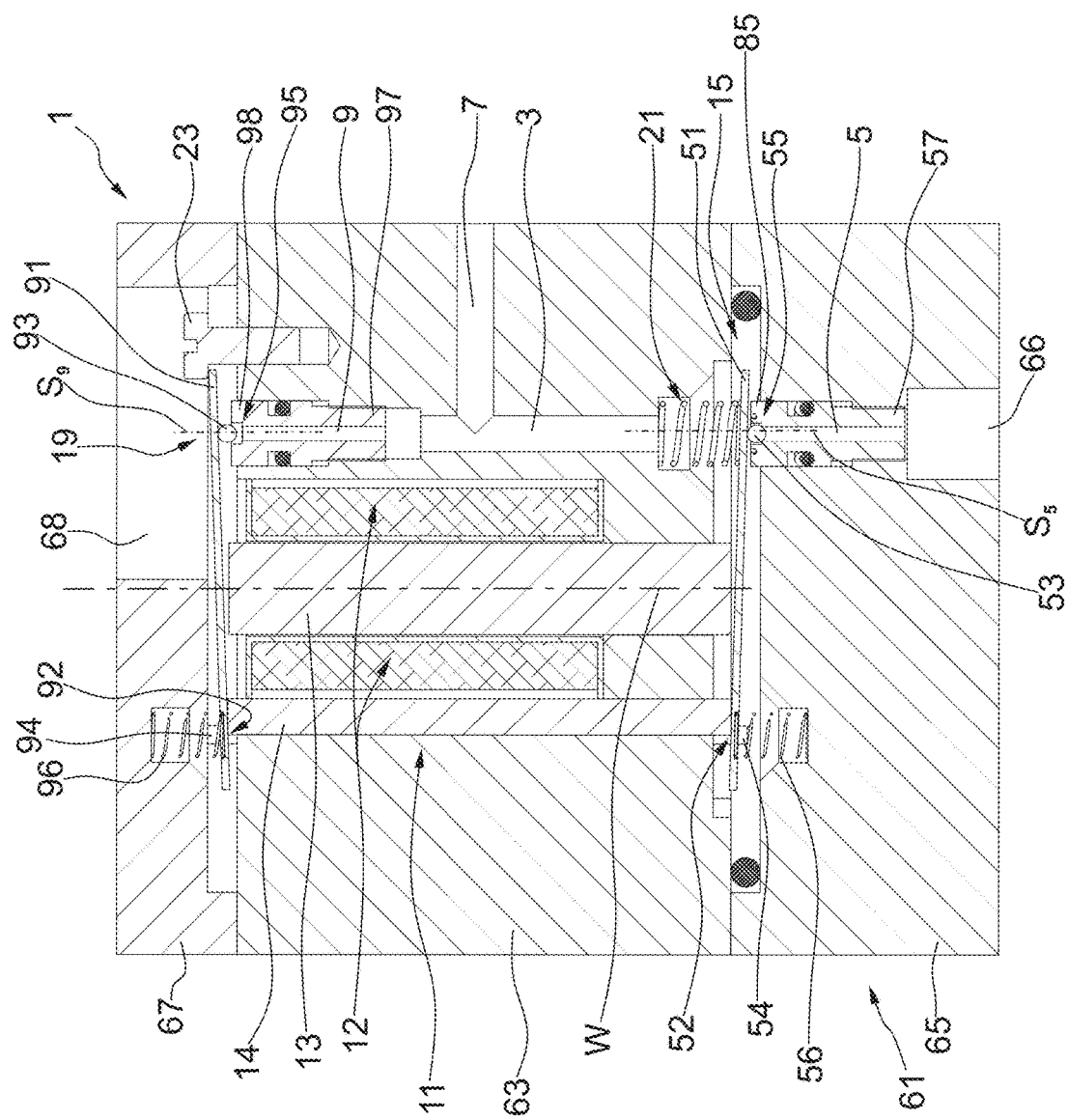
FIG. 2 illustrates an embodiment of the electromagnetic impact valve arrangement according to FIG. 1 in the same cross-sectional view in the state of pressure reduction.
Figure 3:
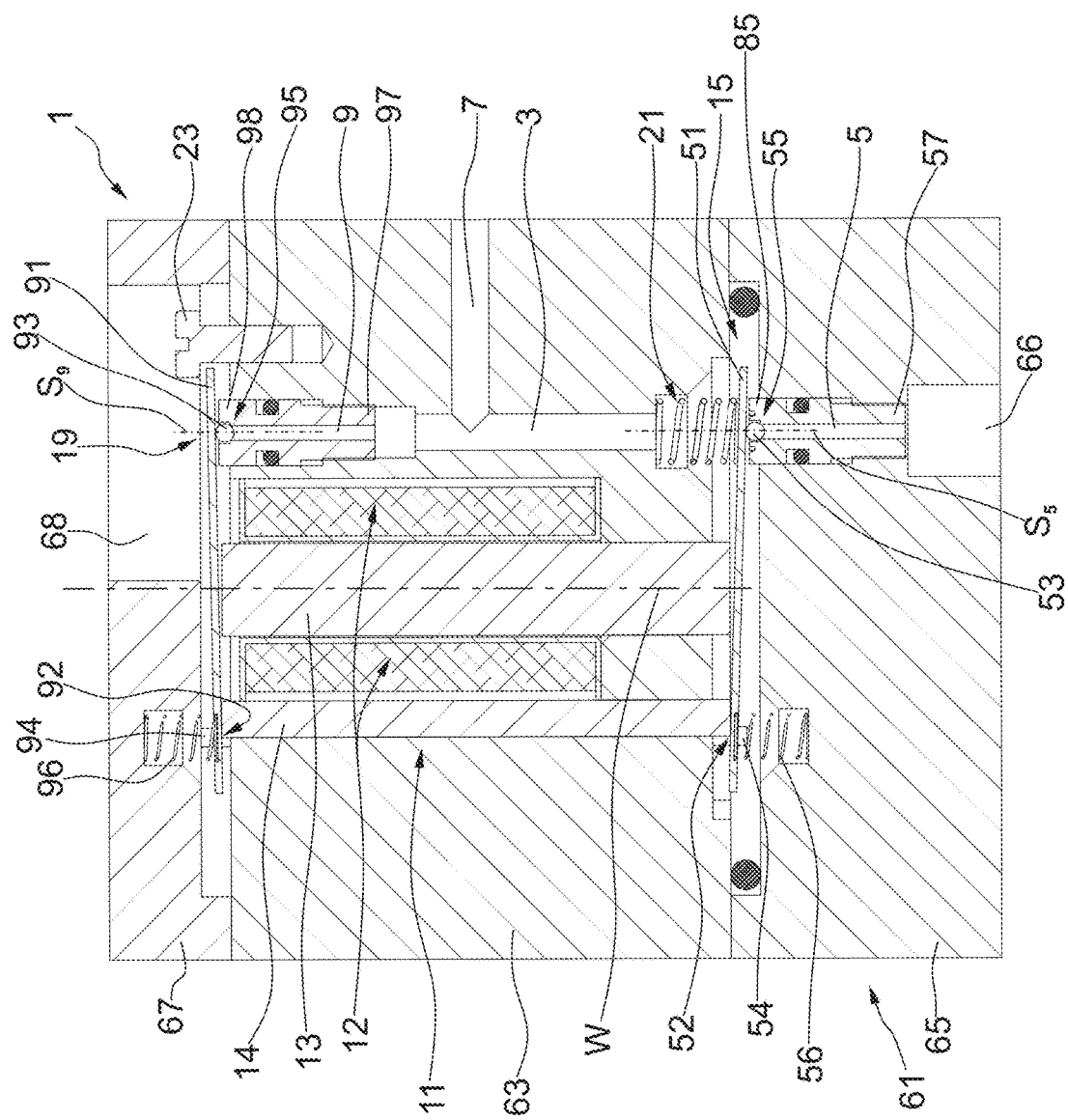
FIG. 3 illustrates an embodiment of the impact valve arrangement according to the disclosure of FIGS. 1 and 2 in a pressure-constant holding state.

In an exemplary embodiment illustrated in FIGS. 1 to 3, the housing structure 61 comprises a support section 63 for supporting the functional components of the impact valve arrangement 1, a supply section 65, on which a connection 66 for a pneumatic compressed air source is provided, and a cover section 67, on which an opening 68 to the atmosphere is provided. In an exemplary embodiment, the support section 63, the supply section 65 and the cover section 67 are connected to one another (e.g. detachably) using, for example, one or a plurality of screw connections (not illustrated). The supply section 65 is sealingly connected to the support section 63. The cover section 67 can be sealingly or non-sealingly connected to the support section 63. In an exemplary embodiment, the housing structure 61 is non-magnetic and can be made of, for example, aluminum, stainless steel, austenitic stainless steel, and/or plastic.

In an exemplary embodiment, the electromagnetic impact valve arrangement is provided as part of a pneumatically operated field device, such as a positioning device, to control the compressed air supply, as the aerating and ventilating, of a pneumatic actuator of the field device. For this purpose, the impact valve arrangement 1 has the control air conduit 7, which provides a fluidic connection between the air chamber 3 of the impact valve arrangement and the (non-illustrated) pneumatic actuator of the field device. The control air conduit 7 is at least partially realized as bore of a section, in particular of the support section 63, of the housing structure 61. In an exemplary embodiment, the field device, which comprises the impact valve arrangement according to the disclosure, is configured such that the pneumatic actuator can receive and output compressed air exclusively via the control air duct 7.

To supply the electromagnetic impact valve arrangement 1 with compressed air or pneumatic supply air from a compressed air supply source, the impact valve arrangement 1 comprises the air supply conduit 5. The compressed air supply duct 5 is in a fluidic connection with a compressed air supply source, which can for example be realized by a compressor, a compressed air tank, or compressed air supply lines. The air supply duct 5 receives compressed air from the supply source and guides the compressed air from the supply source to the air chamber 3. From the air chamber 3, the compressed air received by the compressed air supply source can be transferred through the control air conduit 7 to the pneumatic actuator of the field device. The compressed air supply conduit 5 can be realized at least section by section by a bore in the housing structure 61. When the pneumatic actuator of the field device is fluidically connected to the compressed air supply source via the control air conduit 7, the air chamber 3, and the air supply conduit 5, can the pneumatic actuator be aerated.

The impact valve arrangement 1 comprises a first electromagnetic impact valve 15, which can also be identified as aerating impact valve, by which the flow-through cross section of the air supply conduit 5 can be closed selectively. In the open state of the aerating impact valve 15, compressed air can flow from the supply source through the air supply duct 5 into the air chamber 3. In an exemplary embodiment, in the closed state of the aerating impact valve, the air chamber 3 is sealed tightly against the compressed air supply source.

The electromagnetic impact valve arrangement 1 further comprises a second electromagnetic impact valve 19, which can be identified as venting or ventilation impact valve, by which the venting conduit 9 can be closed selectively. The aerating impact valve 19 has an open state, in which it allows a fluidic connection from the air chamber 3 to a pressure sink, such as the atmosphere, for example through the outlet opening 68. In an exemplary embodiment, in a closed state of the venting impact valve 19, the air chamber 3 is sealed tightly against the pressure sink (e.g. the atmosphere).

The venting or ventilation conduit 9 leads from the air chamber 3 in the direction of a pressure sink, such as the atmosphere. The venting duct 9 can be realized at least sectionally as bore in the housing structure 61. The pneumatic actuator of the field device can be fluidically connected for ventilating the pressure sink by the control air duct 7, the air chamber 3, and the ventilation duct 9.

The compressed air from the compressed air supply source is provided to the impact valve arrangement at the air supply duct 5 with a supply pressure of for example approximately 20 bar or less, 10 bar or less, 6 bar or less, 2 bar or 1 bar. With the help of the electromagnetic impact valve arrangement, a control pressure, which can be in the range between the atmospheric pressure of the pressure sink and the supply pressure, can be provided for the pneumatic actuator of the field device. To increase the adjusting pressure for the pneumatic actuator, the aerating impact valve 15 assumes an open position and the ventilation impact valve 19 assumes a closed position, as is illustrated in FIG. 1.

In an exemplary embodiment, the air chamber 3, which can also be identified as control air chamber, is always in fluidic communication connection with the pneumatic actuator. If, as illustrated in FIG. 1, the impact valve arrangement is brought into a pressure increase state, the air chamber 3 is supplied with compressed air from the compressed air supply source and guides the compressed air from the compressed air supply source through the control air conduit 7. In this pressure increase state, air is conveyed from the compressed air supply source to the pneumatic actuator by the impact valve arrangement, so that additional compressed air volume and/or a rising adjusting pressure is additionally provided for the pneumatic actuator. If the pneumatic actuator is, for example, a pneumatic actuator comprising at least one pneumatic operating chamber, the filling volume and the adjusting pressure in the operating chamber is increased in the pressure increase state by the impact valve arrangement 1, so that an increased adjusting compressive force is provided to the pneumatic actuator, to for example increase a closing effect or to bring an adjusting rod or adjusting shaft in an effective direction by the pneumatic actuator.

In particular when reaching a predetermined adjusting state, for example a predetermined adjusting pressure in the pneumatic actuator, a predetermined adjusting position of an adjusting rod or adjusting shaft of the positioning device, the electromagnetic impact valve arrangement 1 can be controlled to keep the present adjusting pressure constant. The impact valve arrangement 1 can be brought into a pressure constancy state, which is illustrated for example in FIG. 2, in the case of which the first electromagnetic impact valve 15 as well as the second electromagnetic impact valve 19 are closed. In the pressure constancy state, compressed air can neither escape from the air chamber 3 through the ventilation conduit 9, nor can additional supply air flow through the control air conduit 7 into the air chamber 3 in this state. If constant operating conditions of the field device prevail on the output side of the control air conduit 7 in and on the pneumatic actuator connected to the control air conduit 7, and if no leakage is present, the pressure in the pneumatic actuator, the control air conduit 7 and the air chamber 3 remains constant. A pneumatic actuator can realize a constant adjusting force and/or a constant adjusting position by maintaining a constant adjusting pressure.

If the venting valve 19 is opened, as illustrated in FIG. 3, the impact valve arrangement assumes a pressure reducing state. In the pressure reducing state of the impact valve arrangement, the pneumatic actuator, which is connected to the control air conduit 7, is vented via the air chamber 3 and the open venting duct 9 towards the pressure sink, in particular the atmosphere. The positioning force of the pneumatic actuator is reduced and/or the adjusting position of an adjusting member of the pneumatic actuator is changed contrary to the above-mentioned adjusting direction, for example the opening width of a control valve is increased with a reduction of the adjusting pressure in the air chamber 3 and in the control air duct 7 on the pneumatic actuator.

In an exemplary embodiment, the aerating impact valve 15 comprises an impact valve seat 55, which encloses a valve nozzle of the aeration duct 5, and a movable impact valve member, which can be realized as baffle plate 51, which either tightly seals the impact valve seat 55 independent from the position or which can release it for an air passage. In addition to the impact baffle 51 or instead of the baffle plate 51, the impact valve 15 can include a closing body, for example a closing ball 53.

In the case of the aerating impact valve 15, the baffle plate 51 is pivotably supported about a bearing 52. The bearing 52 can for example be formed by a flat bearing surface comprising an outer edge, which defines the pivot axis of the baffle plate 51. In an exemplary embodiment, the baffle plate 51 is pivoted about a pivot axis of the bearing 52. The bearing 52 can be configured as a compensator, such as a retaining spring 56, which acts on the baffle plate 51 or impact plate in a torque-free manner with respect to the pivot axis. The spring 56 presses the impact plate 51 against the bearing surface and the pivot edge of the bearing 52. The bearing 52 can have a safety, for example in the form of a safety pin 54, to prevent a displacement in the transverse or longitudinal direction of the baffle plate 51 and to prevent a loss of the baffle plate. The baffle plate can at least be partially magnetizable, consist for example of soft-magnetic (or ferromagnetic) steel plate, or can have at least a soft-magnetic portion. The soft-magnetic or ferromagnetic portion of the movable impact valve member 51 is attracted by the activated electromagnet 11 towards the iron core 13. The iron core 13 acts as travel limitation for the impact valve member 51 in the direction of the open position of the aeration valve.

The impact valve 15 has a closing ball 53, which is entrained by a closing movement of the impact valve member 15. The closing ball 53 of the impact valve 15 can be brought into an annular abutting contact with the impact valve seat 55, so that the closing ball 53 tightly seals the aeration conduit 5. The closing ball 53 can at least partially consist of a soft-magnetic, for example ferromagnetic material. In an exemplary embodiment, the closing ball 53 is made of a harder material than the material of the impact valve seat 55, for example of hardened steel or ceramic.

The aeration valve 15 is equipped with a coercive or biasing member in the form of a spring 21, which pushes the impact valve member, here the baffle plate 51, with the closing ball 53 into a closed position, so that the aeration valve 15 is closed in the case of an inactive aeration valve, for example in a state of the electromagnetic controller 11 free of an electric current. In an exemplary embodiment, the closing force of the spring 21 is adjusted to the supply air pressure in such a way that in response to maximum pressure difference on the first impact valve 15, a secure closing effect is attained (thus when the air chamber 3 is open towards the pressure sink and is closed with respect to the compressed air supply source), whereby the closing force of the spring 21 is maximally so high that the electromagnetic controller 11 can safely open the first impact valve 15 even in response to minimum pressure difference on the first impact valve 15 (thus when the same or virtually the same pressure prevails in the air chamber 3 as the pressure, which is provided by the compressed air supply source).

In the case of the electromagnetic impact valve arrangement 1 according to the disclosure, provision is made according to the designation thereof for an electromagnetic controller 11 for operating the first impact valve 15. The electromagnetic controller 11 comprises a magnetic coil 12, an iron core 13, and an armature or a yoke 14, respectively. The magnetic coil 12 is arranged around the iron core 13 in a hollow-cylindrical manner. The iron core 13 and the magnetic coil 12 are arranged coaxially to one another and define the effective axis W of the electromagnet 11. With respect to the effective axis W, an armature 14 is arranged radially outside of the cylinder, which is formed by the magnetic coil 12. This armature 14 forms the bearing 52 of the at least partially magnetic impact baffle valve plate 51. The first impact valve 15 is arranged opposite the armature 14 with respect to the effective axis W.

The positioning direction axis $S_5$ of the aeration impact valve 15 runs parallel to the effective axis W of the electromagnet 11. The positioning direction axis $S_5$ is defined by the course of the aeration conduit 5 in the area of the aeration valve 15 or by the axial direction of movement of the closing ball 53, respectively, opposite the valve seat 55.

In the pressure increase state of the impact valve arrangement 1 illustrated in FIG. 1, the electromagnet 11 is controlled to open the aeration valve 15. The electromagnetic controller 11 is energized to open the first impact valve 15, so that a magnetic force acts on the impact valve baffle plate 51, so as to remove the impact valve plate 51 from the valve seat 55 in the axial direction $S_5$.

To open the aeration impact valve 15, the controller 11 overcomes the closing force of the spring 21. The spring 21 is supported inside the air chamber 3 against the housing structure 61 on the one side and against the impact valve member 51 on the other side. The electromagnetic controller 11 can be controlled (e.g. energized) by an activation controller that is configured to generate and provide a voltage and/or current signal (e.g. magnetic control current) to the electromagnetic controller 11 to energize the electromagnetic controller 11 to, for example, open the first impact valve 15. The activation controller can include processor circuitry that is configured to generate and provide a voltage and/or current signal to the electromagnetic controller 11.

FIG. 3 shows the holding state or pressure constancy state of the impact valve arrangement 1. In this state, the magnetic coil 12 is controlled to close the aeration impact valve 15. To close the aeration impact valve 15, the magnetic coil 12 can for example be switched to no current or can only receive a slight electric energy smaller than an aeration valve opening threshold value. In the pressure constancy state of the valve arrangement, the closing force of the spring 21 exceeds the supply compressive force on the aeration valve 15 plus a magnetic adjusting force, which may be exerted on the movable impact valve member 51 by the electromagnetic controller 11. When the holding spring 56 of the bearing 52 acts on the movable impact valve member 51 in a torque-neutral manner with respect to the pivot axis of the bearing 52, the holding spring 56 has virtually no impact on the open and/or closed state of the aeration impact valve 15.

The nozzle diameter on the valve seat 55 can be approximately 0.8 mm and the diameter of the closing ball 53 can be approximately 1.0 mm. In an exemplary embodiment, the aeration impact valve 15 has a nozzle insert 57, which can be screwed into the housing structure 61, which can be connected to (e.g. screwed in) the housing structure 61 so as to form a seal. In an exemplary embodiment, the nozzle insert 57 forms at least one section of the aeration conduit 5 (e.g. coaxially). On the air chamber-side end, the nozzle insert 57 has a valve seat 55 for opening and closing and cooperating with the impact valve member 51. Protruding in the axial direction $S_5$ from the impact valve seat 55 of the nozzle insert 57 in the direction of the air chamber 3, provision can be made for a cylinder sleeve-like guide for the closing ball 53. It is clear that a guide for the closing ball 53 is also used separately from a nozzle insert 57 or can be formed by another component or by a part of the housing structure 61, if no nozzle insert 57 is used. The guide section 58 prevents the closing ball 53 from escaping from the valve axis $S_5$ in the radial direction. The guide section 58 can also be identified as cage section in this respect. It is clear that a closing body can also have a different shape than a spherical shape. Closing bodies can for example be conical, truncated cone-shaped or cylindrical. Instead of a loose closing body, such as the closing ball 53, provision can also be made for a closing element 53, which is fixedly connected to the movable impact valve member, such as the impact plate 51, in particular in a rotationally fixed manner. In an exemplary embodiment, the closing element 53 has a spherical shape, which is particularly well-suited for a tight closing of the valve, in particular in cooperation with a circular nozzle section, which is enclosed by the valve seat 55. The axial guide 58 has a larger inner diameter than the outer diameter of the closing member 53, so that pneumatic supply air can flow from the impact valve 15 between the outer circumference of the closing element 53 and the inner circumference of the axial guide 58. In an exemplary embodiment, the radial distance or gap is smaller than 2 mm, or smaller than 1 mm, 0.5 mm or 0.2 mm.

The aeration valve 15 is arranged on the opening of the aeration conduit 5 to the control air conduit 3. The ventilation valve 19 is arranged on the output-side opening of the ventilation conduit 9.

Preferably, the ventilation valve can be configured structurally, mechanically, pneumatically and/or electromagnetically in accordance with the aeration valve 15. Corresponding components of the aeration valve 15 and of the ventilation valve 19 are provided with similar reference numerals, which for components of the aeration valve 15 start with numeral 5 and for those of the ventilation valve 19 start with numeral 9. In general, the components of the aeration valve 15 or of the first impact valve 15, respectively, are identified as "first" component, and the components of the ventilation valve or second impact valve 19 are identified as "second" component. It is also conceivable that the first impact valve 15 and the second impact valve 19 are realized structurally, mechanically, pneumatically and/or electromagnetically different from one another.

The ventilation impact valve 19 has an impact valve member 91, which can move in the direction of the axis $S_5$ of the impact valve nozzle, which is enclosed by the second impact valve 95. The impact valve member can be realized as pivotable impact plate 91. In an exemplary embodiment, the impact valve member 91 cooperates with a closing body 93, for example a closing ball, for closing the cross section of the ventilation duct 9. In an exemplary embodiment, the impact plate 91 can be rotated about a pivot axis, which is defined by a bearing 92 and which is realized by the outer edge of the armature 14 of the electropneumatic controller 11. The pivot bearing 92 of the impact plate 91 can be secured by a guide pin 94 and/or a holding spring 96, as described above. It is also conceivable that the holding spring 95 of the ventilation impact valve 19 is arranged offset opposite the pivot axis of the bearing 92, so that the holding spring effects a (slight) pretensioning in the direction of the open state of the ventilation impact valve 19. In an exemplary embodiment, the bearing surface of the bearing 92, which can be provided by a surface of the electromagnetic yoke 14, is arranged flat to a front-side surface of the iron core 13, so that the impact plate 91 bears flat on the yoke 14 and the iron core 13 in the activated position of the electromagnet 11 and of the ventilation impact valve 19. The at least partially soft-magnetic, in particular ferromagnetic, impact baffle plate body can form a magnetic closure, so that the energy consumption is reduced. In an exemplary embodiment, the other front side of the iron core 13 is arranged flat and aligned with the bearing surface of the bearing 52, so that the impact plate 51 can also form a magnetic closure.

The ventilation impact valve 19 is illustrated in closed position in FIG. 1. In the closed position of the impact valve 19, the valve seat 95 is sealed tightly by the impact valve member 91, in particular with the help of the spherical closing body 93.

In the pressure-reducing state of the electromagnetic impact valve arrangement according to the disclosure illustrated in FIG. 2, the ventilation impact valve 19 is open. When the ventilation impact valve 19 is open, compressed air can escape from the pneumatic actuator through the control air conduit 7, the air chamber 3 and the ventilation conduit 9 towards the pressure sink. The impact valve member 91 can be pushed into the open state according to FIG. 2, for example by the compressive force between the air pressure between the air pressure in the air chamber 3 and the air pressure on the pressure sink side and/or by a pretensioning, for example by a spring, such as the holding spring 96. The impact valve member 91 as well as possibly the closing body 93 release the valve seat 95 of the ventilation impact valve 19. A stop, for example in the form of a stop screw 23, which limits the adjustment travel of the impact valve member 91 to a permissible maximum, is secured in an adjustable manner on the housing structure 61.

When the ventilation impact valve 19 has a closing ball 93, it comprises a guide 98 for axially guiding along the positioning direction axis $S_9$, which prevents an escape of the closing element 93 in the radial direction. In an exemplary embodiment, the ventilation impact valve 19 includes a valve insert 97, which can be dimensioned in a structurally identical manner to a valve insert 57 of the aeration impact valve 15. By using structurally identical nozzle or valve inserts 57, 97, respectively, in particular with identical sizes for the respective air conduit 5, 9, the respective valve seat 55, 95 and/or the respective closing element 53, 93, if applicable, a pneumatic identity of the two valves 15, 19 can be achieved. If a different pneumatic behavior is desired, different inserts 57, 97 can be used, for example with different air conduit cross sections.

In an exemplary embodiment, the ventilation impact valve 19 is arranged relative to the aeration impact valve 15 in such a way that the first positioning direction axis $S_5$ and the second positioning direction axis $S_9$ run coaxially. Based on the effective axis W of the electromagnetic controller 11, the positioning direction axis $S_9$ of the second impact valve 19 can be arranged in the radial direction outside of the cylinder area, which is defined by the iron core 13 and outside of the cylinder area, which is defined by the magnetic coil 12. In the alternative, the positioning direction axis $S_9$ of the second impact valve 19 can run coaxially to the effective axis W of the electromagnet 11 (not illustrated). For example, the ventilation valve 19, in particular a valve insert 97, could be introduced into the iron core 13 of the electromagnetic controller 11.

In consideration of the supply pressure, the two impact valves 15, 19 of the electromagnetic impact valve arrangement 1 are pneumatically, mechanically and electromagnetically dimensioned in such a way that the impact valve arrangement can assume the states of pressure increase, pressure constancy and pressure reduction. In an exemplary embodiment, the electromagnetic closing force for tightly sealing the ventilation impact valve 19 is at least slightly smaller than the required electromagnetic opening force for opening the aeration impact valve 15. In the pressure-reducing state illustrated in FIG. 2, the electromagnetic controller 11 can for example be controlled in a currentless manner or with a magnet control current, which lies below the ventilation threshold value. In that the electromagnetic controller 11 is operated with a magnetic control current, which lies above the ventilation threshold value, but below the aeration threshold value, the pressure constancy state can be effected, in which the electromagnet 11 provides an adjusting force, which is large enough to close the ventilation valve 19 on the one hand, even if the maximally available supply pressure of the compressed air supply source prevails in the pneumatic actuator or the control duct 7 of the control air 3, respectively. In this pressure constancy state illustrated in FIG. 3, a sufficiently low magnetic control current is furthermore applied on the electromagnet 11, so that the aeration impact valve 15 is left in the closed position.

In the case of pneumatically and electromagnetically identically dimensioned first and second impact valve 15, 19, it can be the biasing member 21, which effects the control force difference. It is also conceivable to electro-magnetically dimension the electromagnetic controller 11 and the two impact valves 15, 19 in such a way that the same magnetic control current, which acts on the electromagnetic controller 11, results in different magnetic adjusting forces with respect to the different impact valves 15, 19. It is also conceivable that, for example by different lever lengths of the impact baffle plates 51, 91, a different mechanical dimensioning of the two impact valves 15, 19 occurs, which, in the case of identical magnetic control current, allows different closing forces to act on the respective impact valve seat 55, 95 (and if applicable of the respective closing element 53, 93) as a function of the respective lever length of the respective impact plate 51, 91. It is also conceivable to dimension the impact valves 15, 19 pneumatically differently, so that different effective compressive force cross sections are formed on the respective valve seat 55, 95, according to the formula $F_P = Q \times \Delta_p$ (wherein $F_P$ identifies the compressive force, Q the respective effective pneumatic cross section of the valve, and $\Delta_P$ the pressure difference on the respective valve). When the same pressure difference applies, different compressive forces $F_P$ can be applied on the respective impact valve 15, 19 as a result of pneumatic valve cross sections Q, which are dimensioned to differ in size. Combinations of the same and/or of different dimensioning of the two impact valves 15, 19 are possible. In an exemplary embodiment, the impact valves 15, 19 are dimensioned electromagnetically and pneumatically identically, as illustrated.

Figure 4:
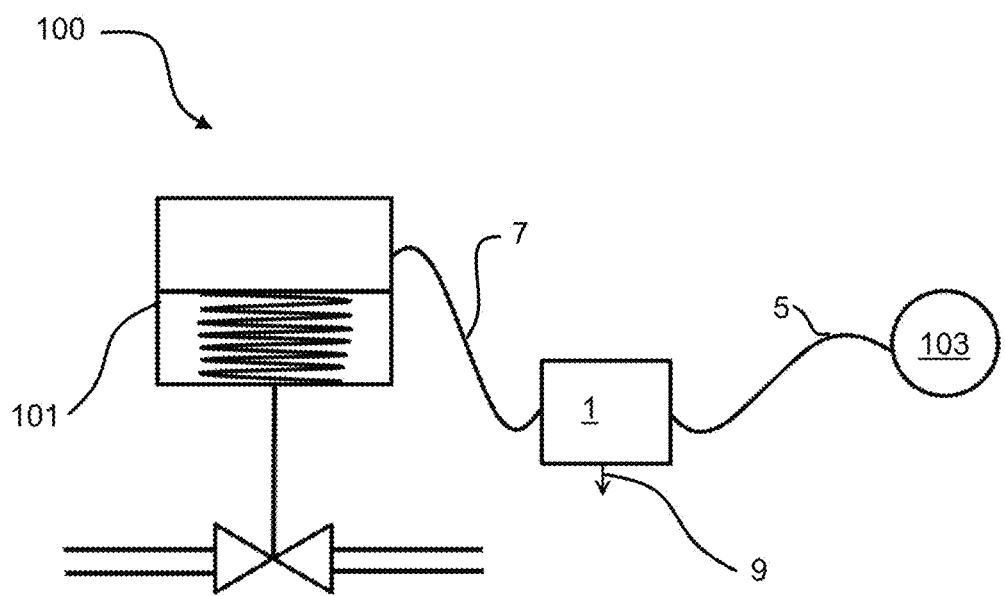
FIG. 4 illustrates a field device with a single-action pneumatic drive and a pneumatic valve arrangement according to an exemplary embodiment of the disclosure.

FIG. 4 shows a pneumatically operated field device 100 including a pneumatic valve arrangement 1 which may be designed as described above. The field device 100 of FIG. 4 includes a pneumatic actor realized as a single-action pneumatic linear drive 101 with spring return which is in pneumatic communication with the control air conduit 7.

The pneumatic actuating drive 101 has its pneumatic working chamber connected with only one respective pneumatic control inlet for increasing and/or lowering pressure. This singular pneumatic control inlet is connected one respective control air conduit 7 of ether the first or second pneumatic valve arrangement 1. The field device 100 may further comprise a pneumatic source 103 of pressurized or compressed air, such as a pressurized air tank, a compressor, a supply line or the like, which is connected pneumatically to the air supply conduit 5.

The features disclosed in the above description, the figures and the claims can be significant for the realization of the disclosure in the different embodiments, both alone and in any combination.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

For the purposes of this discussion, "processor circuitry" can include one or more circuits, one or more processors, logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. In one or more exemplary embodiments, the processor can include a memory, and the processor can be "hard-coded" with instructions to perform corresponding function(s) according to embodiments described herein. In these examples, the hard-coded instructions can be stored on the memory. Alternatively or additionally, the processor can access an internal and/or external memory to retrieve instructions stored in the internal and/or external memory, which when executed by the processor, perform the corresponding function(s) associated with the processor, and/or one or more functions and/or operations related to the operation of a component having the processor included therein. In one or more of the exemplary embodiments described herein, the memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 1 impact valve arrangement
3 air chamber
5, 7, 9 air duct
11 controller
12 magnetic coil
13 iron core
14 armature
15, 19 impact valve
23 stop adjusting screw
51, 91 impact plate
53, 93 closing element
55, 95 impact valve seat
$S_5$, $S_9$ positioning direction axis
W effective axis

The invention claimed is:

1. An electromagnetic impact plate valve arrangement for a pneumatically operated field device, comprising:
an air chamber, into which three air conduits lead, the three air conduits including:
an air supply conduit configured to receive compressed air from a compressed air supply source,
a control air conduit configured to aerate and vent a pneumatic actuator of the pneumatically operated field device, and
a venting conduit configured to output compressed air to a pressure sink;
a first electromagnetic impact valve configured to open and/or close the air supply conduit; and
a second electromagnetic impact valve configured to open and/or close the venting conduit, wherein the first and the second electromagnetic impact valves are attuned such that the air supply conduit and the ventilation conduit are closeable at the same time.

2. The impact plate valve arrangement according to claim 1, wherein the first impact valve and the second impact valve are attuned such that:
the second impact valve closes before the first impact valve opens; and
the first impact valve closes before the second impact valve opens.

3. The impact plate valve arrangement according to claim 1, wherein the first impact valve comprises:
an impact valve member;
an electromagnetic controller configured to displace the impact valve member to open and/or close the supply air conduit in an axial control direction; and
a force-adjustable biasing member with adjustable pretension that is configured to force the impact valve member in the axial control direction into a closed position to close the supply air conduit.

4. The impact plate valve arrangement according to claim 3, wherein the first impact valve is configured to adjust a predetermined control pressure in the air chamber and/or the control air conduit based on a control current of the electromagnetic controller.

5. The impact plate valve arrangement according to claim 3, wherein the impact valve member is a baffle plate and the force-adjustable biasing member is a spring.

6. The impact plate valve arrangement according to claim 1, wherein the first impact valve is closed in the absence of current and the second impact valve is open in the absence of current.

7. The impact plate valve arrangement according to claim 1, further comprising a magnetic coil, an iron core and/or an armature that are in electromagnetic operative connection with the first impact valve and the second impact valve to electromagnetically couple the first impact valve and the second impact valve to one another.

8. The impact plate valve arrangement according to claim 1, wherein the first impact valve and the second impact valve are electromagnetically coupled together.

9. The impact plate valve arrangement according to claim 1, wherein the first impact valve and the second impact valve are identically electromagnetically dimensioned such that substantially identical magnetic forces act on the first impact valve and on the second impact valve in response to an application of a same magnetic control current.

10. The impact plate valve arrangement according to claim 1, wherein the first impact valve and the second impact valve are identically pneumatically dimensioned such that identical pneumatic compressive forces act on respective impact valve members of each of the first and the second impact valves in response to an application of a same pressure difference on the respective first and second impact valves.

11. The impact plate valve arrangement according to claim 1, wherein the first impact valve and/or the second impact valve comprise a respective closing body located on a positioning direction axis and configured to close the respective air conduit engage with a valve nozzle of the respective air conduit encompassed by a respective impact valve seat such that a respective impact valve member of the first and second impact valve is arranged at a circumferential axial distance to the valve nozzle.

12. The impact plate valve arrangement according to claim 1, wherein the second impact valve comprises:
an impact valve member;

an electromagnetic controller configured to displace the impact valve member to open and/or to close the venting conduit in an axial control direction; and a mechanical abutment arranged in the axial control direction opposite an impact valve seat and configured to limit a maximum axial travel range of the impact valve member of the second impact valve.

13. The impact plate valve arrangement according to claim 12, wherein the impact valve member is a baffle plate and the mechanical abutment is a stop adjusting screw.

14. The impact plate valve arrangement according to claim 3, wherein the second impact valve comprises:
an impact valve member;
an electromagnetic controller configured to displace the impact valve member to open and/or to close the venting conduit in an axial control direction; and
a mechanical abutment arranged in the axial control direction opposite an impact valve seat and configured to limit a maximum axial travel range of the impact valve member of the second impact valve.

15. The impact plate valve arrangement according to claim 14, wherein the impact valve member is a baffle plate and the mechanical abutment is a stop adjusting screw.

16. The impact plate valve arrangement according to claim 1, wherein the first impact valve and/or the second impact valve comprises a valve nozzle on a control direction axis, the valve nozzle being encompassed by a respective impact valve seat, and wherein the control direction axis is oriented substantially parallel to an axis of an electromagnet of the impact plate valve arrangement and is arranged in an area of the iron core.

17. The impact plate valve arrangement according to claim 16, wherein the control direction axis is arranged coaxially to the iron core.

18. The impact plate valve arrangement according to claim 1, wherein the first impact valve and/or the second impact valve comprises a valve nozzle on a control direction axis, the valve nozzle being encompassed by a respective valve seat, and wherein the control direction axis is arranged offset to an axis of an electromagnet of the impact plate valve arrangement.

19. The impact plate valve arrangement according to claim 18, wherein the control direction axis is arranged offset to the axis of the electromagnet by at least an outer radius of an iron core or a radius of a magnetic coil of the impact plate valve arrangement.

20. The impact plate valve arrangement according to claim 1, wherein the pneumatically operated field device is a positioning device of a processing plant.

* * * * *